United States Patent
Yu et al.

(10) Patent No.: US 11,352,866 B1
(45) Date of Patent: Jun. 7, 2022

(54) ENHANCED OIL RECOVERY METHOD WITH SINGLE WELL HUFF AND PUFF AND INTER-SEGMENT OIL DISPLACEMENT AFTER HORIZONTAL WELL FRACTURING

(71) Applicant: YANGTZE UNIVERSITY, Jingzhou (CN)

(72) Inventors: Weichu Yu, Jingzhou (CN); Ying Zhang, Jingzhou (CN); Fei Ding, Qingdao (CN); Lei Zhang, Wuhan (CN); Jianglu Jing, Karamay (CN); Aibin Wu, Jingzhou (CN); Wenming Shu, Jingzhou (CN); Zhengdong Lei, Beijing (CN); Huan Yang, Jingzhou (CN); Pingtian Fan, Yanan (CN); Dongkui Zhou, Jingzhou (CN); Hui Zhao, Wuhan (CN); Wenjie Xia, Tianjin (CN); Chaoyi She, Chengdu (CN); Shuaishuai Li, Karamay (CN); Zhenhu Lv, Karamay (CN)

(73) Assignee: YANGTZE UNIVERSITY, Jingzhou (CN)

( * ) Notice: Subject to any disclaimer, the term of this patent is extended or adjusted under 35 U.S.C. 154(b) by 0 days.

(21) Appl. No.: 17/168,841

(22) Filed: Feb. 5, 2021

(30) Foreign Application Priority Data

Jan. 14, 2021 (CN) .......................... 202110048948.4

(51) Int. Cl.
*E21B 43/16* (2006.01)
*C09K 8/582* (2006.01)
*E21B 43/26* (2006.01)

(52) U.S. Cl.
CPC .............. *E21B 43/16* (2013.01); *C09K 8/582* (2013.01); *E21B 43/26* (2013.01)

(58) Field of Classification Search
CPC .......... E21B 43/16; E21B 43/20; E21B 43/25; E21B 43/305; E21B 43/17; E21B 43/26; E21B 43/162
See application file for complete search history.

(56) References Cited

FOREIGN PATENT DOCUMENTS

| CA | 2991871 A1 | * | 7/2019 | ............. E21B 34/14 |
|---|---|---|---|---|
| CN | 108843291 A | * | 11/2018 | ............. E21B 43/17 |
| CN | 111205842 A | * | 5/2020 | |
| CN | 111827942 A | * | 10/2020 | |

* cited by examiner

*Primary Examiner* — Zakiya W Bates
(74) *Attorney, Agent, or Firm* — WPAT, PC

(57) ABSTRACT

An enhanced oil recovery method includes: screening out implementation well that meet the requirements of a preset standard; selecting the target interval that can be used for enhanced oil recovery in the implementation well; obtaining the reservoir parameters and perforation parameters of the target interval, so as to divide the target interval into several groups of swallowing and exhaling segments, injecting the infection liquid containing and simmer the well for a period of time; and after the well simmering, the oil-water mixture replaced by the injection fluid is produced from each exhaling segment.

7 Claims, 2 Drawing Sheets

ENHANCED OIL RECOVERY METHOD WITH SINGLE WELL HUFF AND PUFF AND INTER-SEGMENT OIL DISPLACEMENT AFTER HORIZONTAL WELL FRACTURING

FIELD OF THE DISCLOSURE

The disclosure relates to enhanced oil recovery method with single well huff and puff and inter-segment oil displacement after horizontal well fracturing.

BACKGROUND

At present, no matter whether it is a conventional vertical well or an unconventional horizontal well, new fractures in tight oil reservoirs are generated through fracturing, which can establish new oil and gas seepage channels, change the fluid seepage and displacement laws of oil and gas layers, obtain the effective reformed volume of a single well, and obtain better recovery results. However, in the later stage of oil exploitation, the natural energy of the reservoir is depleted, and the energy of the reservoir decreases rapidly, resulting in a decrease in the fluid supply capacity of the reservoir, a decrease in the production pressure difference, a rapid decline in production, and a low total output, which makes it impossible to achieve economic exploitation of the reservoir.

The microbial flooding enhanced oil recovery technology has the advantages of low cost, convenient construction, wide application range, no damage to the formation and construction equipment, and no environmental pollution. The conventional microbial enhanced oil recovery construction methods mainly include: single well huff and puff, microbial water flooding, microbial cycle flooding, microbial water fracturing, and the combined use of microorganisms and other oil recovery measures, such as polymer flooding, alkali/surfactant/polymer (ASP) flooding, and surfactant flooding.

The microbial single well huff and puff construction refers to the injecting of injection fluid containing a specific microbial oil-displacing agent into the target intervals of the oil production well through the annulus of the drilling casing. Through the action of the microorganisms themselves and their metabolites, The wellbore and near-surface formations of the target intervals of the oil production well are treated to degrade paraffin and heavy hydrocarbons to improve the physical properties of crude oil, reducing the flow resistance of crude oil, and increasing the output of the oil well; the injection-production construction refers to injecting the injection fluid into the target interval of the water injection well after the treatment of the target interval of the oil production well, the injected water flows to the target interval of the oil production well to displace the oil and gas in the reservoir of the oil production well.

The current microbial single well huff and puff enhanced oil recovery technology generally adopts the construction method of injecting oil-displacing agent from the annulus of the production well drilling casing and then closing the well. For example, in the microbial flooding enhanced oil recovery method disclosed the patent titled "Method for single well huff and puff oil recovery in a heavy oil well" with the application number of CN201610250023.7, the construction process is divided into two periods and the construction process is as long as 7 months. The target daily liquid production is equal with the daily liquid production before construction. Another example is the microbial flooding enhanced oil recovery method disclosed in the patent titled "method for microbial single well huff and puff oil recovery from a low-yield and low-efficiency oil well" with the application number of CN201710500967.X, which requires 65-140 days from the beginning of construction to the final production of the well.

The existing microbial flooding enhanced oil recovery method has the following defects:

(1) for the single well huff and puff construction, long construction period and complex construction process are common, which affects the oil well development cycle;

(2) it is necessary to open and close the well multiple times, thereby affecting the energy supplement of the reservoir;

(3) in the single well huff and puff construction, the injection fluid containing the microbial oil-displacing agent that enters later is discharged first in the target interval, the oil-displacing agent cannot be transferred and diffused to the remote well zone, and the oil-displacing agent has a small spread range, which reduces the mining output of available reservoirs;

(4) during the injection-production construction process, problems such as water blocking effect and water channeling are prone to occur, which makes it difficult to effectively supplement the reservoir energy.

SUMMARY

Enhanced oil recovery method with single well huff and puff and inter-segment oil displacement after horizontal well fracturing, including the following steps:

S1 screening out implementation well that meet the requirements of a preset standard;

S2 selecting the target interval that can be used for enhanced oil recovery in the implementation well;

S3 obtaining the reservoir parameters and perforation parameters of the target interval, so as to divide the target interval into several groups of swallowing and exhaling segments;

S4 injecting the injection liquid containing microbial oil-displacing agent into each of the swallowing segments, and simmer the well for a period of time;

S5 after the well simmering, the oil-water mixture replaced by the injection fluid is produced from each exhaling segment.

The beneficial effects of the technical solution proposed by this disclosure are as follows:

(1) when the technical solution proposed by this disclosure is implemented, it is not necessary to use water injection wells to perform water flooding on the target interval of the oil production well, and can realize the enhanced oil recovery function of microbial water flooding in one step, so that the construction period is relatively short and the construction process is simple, which is beneficial to speed up the progress of oilfield exploitation;

(2) the technical solution proposed by this disclosure does not need to open and close the well multiple times, thereby not affecting the energy supplement of the reservoir;

(3) in the technical solution proposed by this disclosure, the injection fluid containing the microbial oil-displacing agent is injected from the swallowing segments, and the displaced crude oil is transported to the exhaling segments, which can not only greatly increase the communication scope of the oil-displacing agent, connect remaining oil areas in the near and far well zones, but also reduce the oil-water interfacial tension and crude oil viscosity, realize the stimulation effect of enhanced oil recovery, compensate the pressure and fluid deficit caused by production, supplement the formation energy of the low-pressure layer, and achieve the effect of energy-enhancement and oil displacement after the fracturing of horizontal well reservoir, thus increasing the output of a single well;

(4) problems such as water lock effect and water channeling will not occur.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The embodiment of this disclosure provides a method and system for integrated linkage analysis between logging and core data, which are used to accurately and efficiently perform linkage comprehensive analysis and interpretation of various data.

In order to make the objectives, features, and advantages of this disclosure more obvious and understandable, the technical solutions in the embodiments of this disclosure will be described clearly and completely in conjunction with the accompanying drawings in the embodiments of this disclosure. Obviously, the following described embodiments are only a part of the embodiments of this disclosure, rather than all the embodiments. Based on the embodiments of this disclosure, all other embodiments obtained by those of ordinary skill in the art without creative work shall fall within the protection scope of this disclosure.

Figure 1:
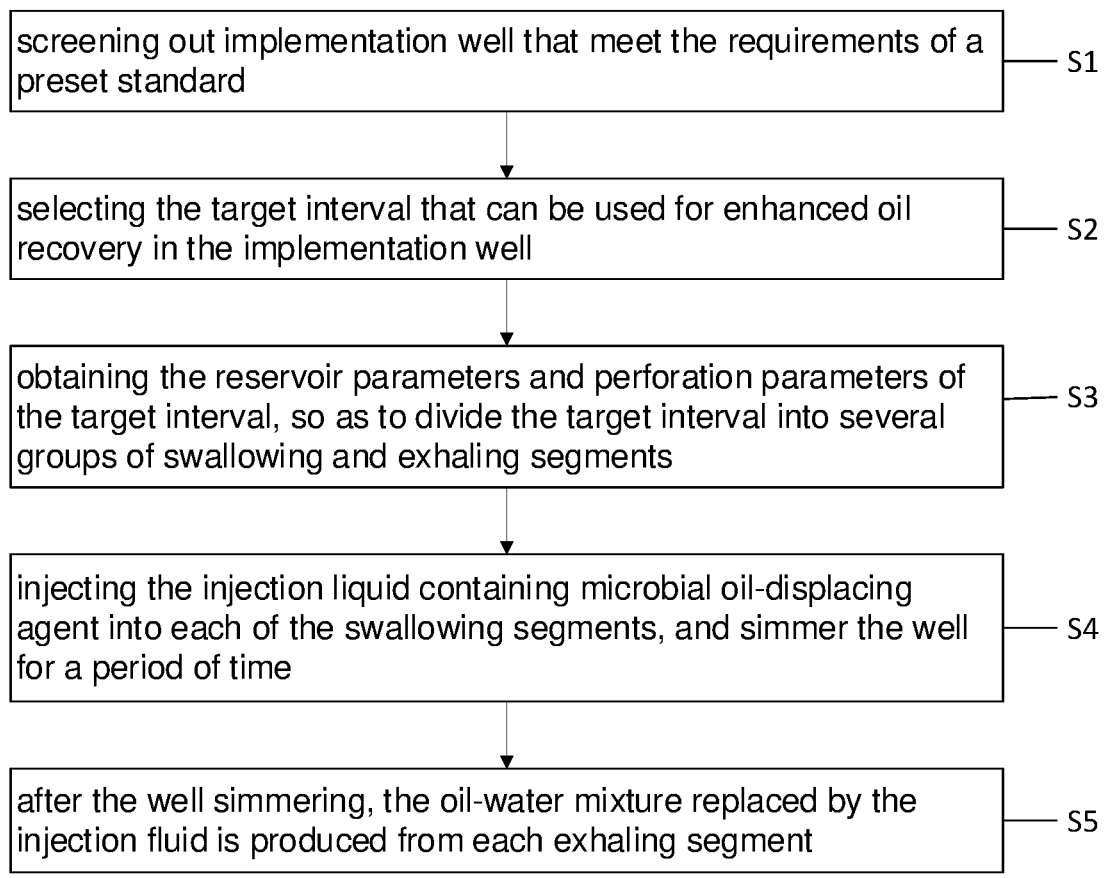
FIG. 1 is a schematic flow chart of the enhanced oil recovery method with single well huff and puff and inter-segment oil displacement after horizontal well fracturing.

In order to verify the feasibility of this disclosure, a tight oil exploitation well in the northern Shaanxi slope zone of the Ordos Basin was selected as an implementation well. The implementation well is constructed using the enhanced oil recovery method with single well huff and puff and inter-segment oil displacement after horizontal well fracturing provided by this disclosure. Please refer to FIG. 1, the method includes the following steps:

S1 screening out implementation well that meet the requirements of a preset standard.

Wherein, the preset standards are: reservoir temperature <90° C., reservoir pressure <15 MPa, formation water salinity <12000 mg/L, formation permeability >5×10$^{-3}$ µm$^2$, crude oil viscosity <50,000 mPa·s.

S2 selecting the target interval that can be used for enhanced oil recovery in the implementation well.

In this embodiment, the selected implementation well is a horizontal well. The completion depth of the horizontal well is 1632 m, the length of the horizontal well section is 664 m, and the vertical depth of the horizontal well section is 770 m, which is cementing and completion of 5½" casing under 8½" downhole, oil layer casing: 5½" (139.7 mm), 9.17 mm, depth: 1629.0 m, formation pressure: 6.27 MPa (pressure coefficient is 0.81), formation temperature: 35° C. (geotemperature gradient is 2.73°/100 m).

S3 obtaining the reservoir parameters and perforation parameters of the target interval, so as to divide the target interval into several groups of swallowing and exhaling segments.

Wherein, the reservoir parameters include sensitivity analysis data, fluid property data, and production data, and the perforation parameters include the number of perforation clusters, cluster length, cluster spacing, and the number of holes per cluster.

In this embodiment, a corresponding number of tubing stubs, standard tubing and tubing packers are configured according to the segmentation and perforation data of step S3. The short section of the oil pipe is equipped with a check valve for swallowing or exhaling.

S4 after the well simmering, the oil-water mixture replaced by the injection fluid is produced from each exhaling segment.

In this disclosure, the channels formed during the fracturing and perforation stages are directly used to inject the injection fluid containing the microbial oil-displacing agent. Please refer to Table 1. The following parameters are the parameters of the implementation well in the fracturing and perforation stage: the implementation well is a horizontal well and is divided into 8 sections, the well section is 880-1580 m, the section length is 90 m, the fracturing section is 700 m long, and the perforated section is 886-1573 m. Perforation in 5 clusters per section, 8 holes in each cluster, 40 holes in each section, cluster spacing 15-18 meters, perforation diameter is 10-14 mm with spirally arranged holes. A total of 40 clusters of perforation are evenly distributed in the wellbore of the horizontal well. The flow rate of the fracturing liquid is 12 m$^3$/min.

Preferably, the volume of the injection fluid injected into the swallowing segment is 30%-40% of the fracturing fluid volume, and the flow rate of the injection fluid is 3-6 m$^3$/min to ensure that the injection volume can cover the remaining oil areas in the near well and far well zone of this segment and each half of the front and back segments, and also increase the reservoir pressure, the wellhead pressure does not exceed 25 MPa.

Specifically, before the step S4, the method further includes the following step: running a packer and a production tubing into the implementation well to set the target interval of the implementation well. By injecting clean water through the oil production pipe to quickly increase the flow rate to achieve the pressure of the oil pipe. When the net pressure of the packer reaches 5 MPa, keeping for 5 minutes to set the packer and then stopping the pump.

Preferably, the mass percentage of the biological oil-displacing agent in the injection liquid is 0.25-1.0%.

More preferably, the mass percentage of the biological oil-displacing agent in the injection liquid is 0.5%.

Preferably, the biological oil-displacing agent is HE-BIO biological oil-displacing agent, which can effectively reduce the surface and interfacial tension of oil and water, and activate the crude oil in the pores of the reservoir through emulsification; it has lower adsorption loss and biological viscosity reduction effect, which can penetrate deeper into the reservoir and improve the repellency of crude oil; at the same time, the biological oil-displacing agent contains biological response factors, so that the same effect can be achieved with a relatively small dose, which can effectively resist sulfate reducing bacteria and iron oxidizing bacteria, reduce the corrosion of carbon steel pipelines, and reduce the generation of harmful gases.

Preferably, the duration of the well simmering is 10-15 days to achieve the effect of energy enhancement and oil displacement.

In this embodiment, please refer to Table 1, the horizontal layer is divided into several groups of swallowing and exhaling segments, of which the second, fourth, sixth, and eighth segments are the swallowing sections, and the first, third, fifth, and seventh are the exhaling segments. The injection volume of the swallowing segment is 30% of the fluid used during fracturing in half (total if the front and rear sections are the start or end sections) of the front and rear sections of this segment. Each section is equipped with a short tubing joint. The tubing stub specification is Φ73.2× 1000 mm. The middle position of the tubing stub section is welded with 4 one-way valves at equal intervals in the circumferential direction. The check valve diameter is Φ15-20 mm. Among them, 4 tubing stubs are swallowed check valves, 4 other tubing short sections are exhaling check valves. The lowering position of the tubing nipples corresponds to the third cluster of perforation in each segments. The tubing nipples are connected by standard tubing of the same specification, the tubing packer is installed between the standard tubing, and the end of the tubing is blocked with a tubing cap.

Figure 2:
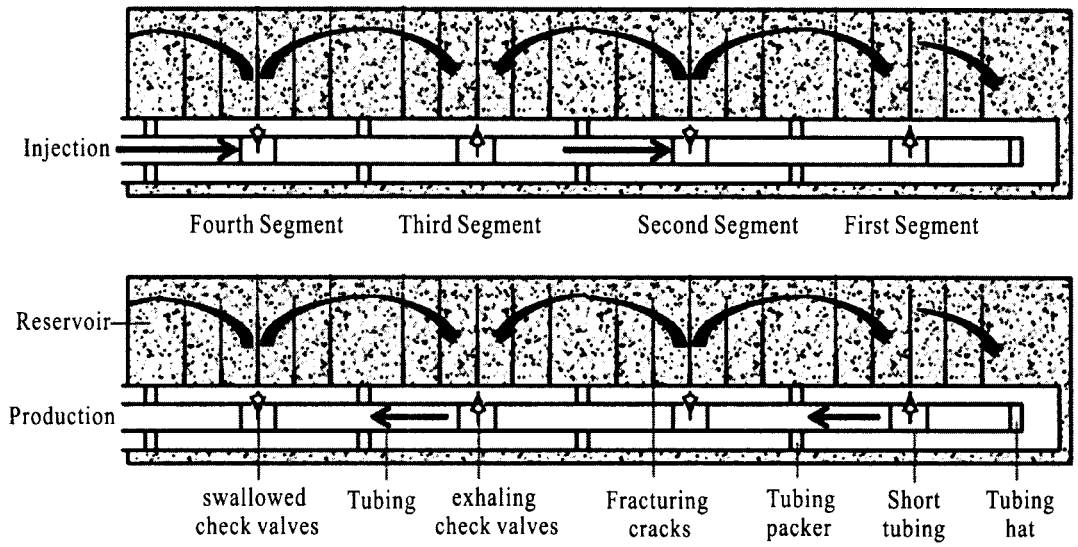
FIG. 2 is a schematic diagram of the construction pipe string construction method of a preferred embodiment of the enhanced oil recovery method with single well huff and puff and inter-segment oil displacement after horizontal well fracturing.

Table 1 Implementation of well swallowing/exhaling segmentation, injection volume, short tubing and packer position table Please refer to Table 1 and FIG. 2, the construction string (from bottom to top) includes: tubing cap+D73.02 mm tubing+tubing stub+D73.02 mm tubing+packer++D73.02 mm tubing+tubing stub+D73.02 mm tubing to the wellhead, the downhole string must be carefully inspected and measured accurately. The thread must be coated with sealing grease and tightened to ensure that it will not be punctured or leaked. Step S4 specifically includes the following steps:

(1) Unblocking, scraping and washing the well. Using Φ73 mm tubing or Φ73 mm drill pipe with an outer diameter of 116 mm*2 m to unblock the well to the bottom of the well, washing the well with positive circulation of clean water for 2-3 weeks, and discharging the pipe string in the well. Lowering the GX140 scraper to scrape, and repeatedly scraping the pipe 3-4 times for the packer setting well section. Washing the well with clean water positively for 2-3 weeks, with a flow rate higher than 0.6 m³/min. It is qualified that the string is lifted and dropped without obvious scratching, and the string is lifted from the well;

(2) Lowering the construction pipe string in the implementation well and installing KQ105/78 fracturing wellhead;

(3) After the packer is seated, injecting clean water through the tubing to quickly increase the displacement to achieve tubing holding pressure. When the net pressure of the packer reaches 5 MPa, keeping for 5 minutes to seat the packer and then stopping the pump.

S5 After the well simmering, the oil-water mixture replaced by the injection fluid is produced from each exhaling segment Preferably, the step S5 further includes the following step: obtaining the pressure drop, daily fluid production and incremental data during the simmering period to evaluate the

TABLE 1

Implementation of well swallowing/exhaling segmentation, injection volume, short tubing and packer position table

| Segment | Begin depth/m | End depth/m | Swallowing/ exhaling segmentation | Injection volume/m³ | Short tubing/m | | Number of holes | Packer depth/m |
|---|---|---|---|---|---|---|---|---|
| First Segment | 1490 | 1580 | Exhaling | | 1534 | 1535 | 4 | Artificial hole bottom |
| Second Segment | 1400 | 1490 | Swallowing | 1290 | 1446 | 1447 | 4 | 1490 |
| Third Segment | 1310 | 1400 | Exhaling | | 1355 | 1356 | 4 | 1400 |
| Fourth Segment | 1220 | 1310 | Swallowing | 840 | 1265 | 1266 | 4 | 1310 |
| Five Segment | 1130 | 1220 | Exhaling | | 1175 | 1176 | 4 | 1220 |
| Sixth Segment | 1040 | 1130 | Swallowing | 765 | 1085 | 1086 | 4 | 1130 |
| Seventh Segment | 950 | 1040 | Exhaling | | 995 | 996 | 4 | 1040 |
| Eighth Segment | 880 | 950 | Swallowing | 405 | 915 | 916 | 4 | 950 |
| Total | 700 | | | 3300 | | | 16/16 | |

Note:
1) The perforation cluster is adjusted according to the magnetic positioning and casing coupling, avoiding the coupling and short sleeve;
2) Leave a 19-meter pocket at the bottom of the well;
3) Perforation aperture is 10-14 mm;
4) Perforation clusters are uniformly distributed in the fractured well section 880-1580 m;
5) The holes are arranged in a spiral.

production cycle and input-output ratio of single well stimulation and energy-enhancing oil displacement.

Figure 3:
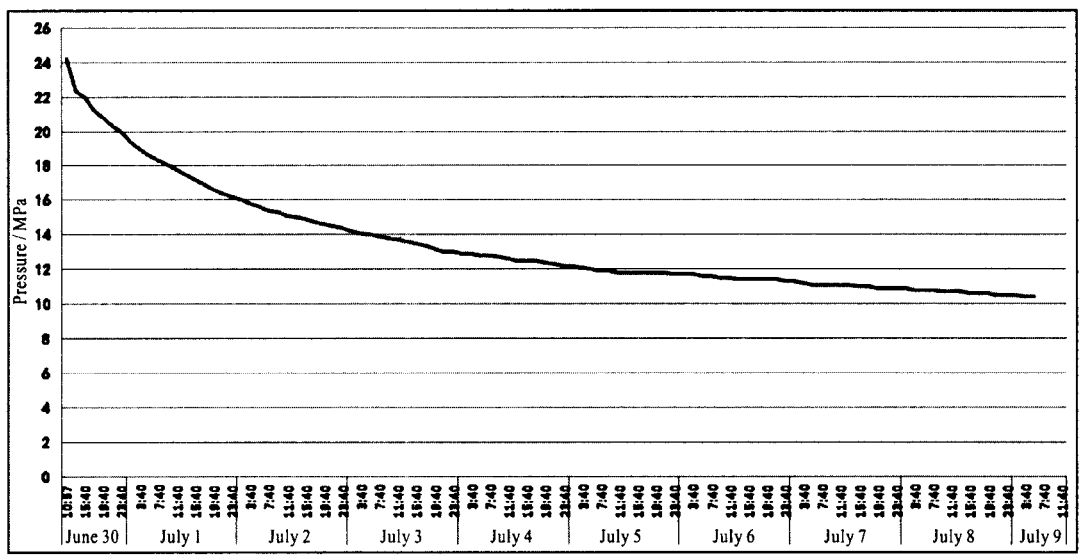
FIG. 3 is a schematic structural diagram showing the pressure change during the well simmering process over time in a preferred embodiment of the enhanced oil recovery method with single well huff and puff and inter-segment oil displacement after horizontal well fracturing.

In this embodiment, please refers to FIG. 3, the pressure of the simmering well in 9 days has dropped from 24.2 MPa to 10.4 MPa, which is 13.8 MPa, and the pressure is still slowly decreasing. The initial pressure spreads quickly, indicating that the original target layer is well developed and the sand body spreads in a large range; after the 4th day, the pressure decline trend slows down, and it is considered that the pressure is gradually approaching the formation pressure. The oil-water replacement process of the braised well is basically completed and the well is reaching the condition of opening and spraying. The post-pressure G function analysis shows that the fitted reservoir pressure has increased by 4.18 MPa compared to the original pressure, indicating that the large liquid injection has played a certain role in energy storage, compensating for the pressure and fluid deficit caused by production, and supplementing the formation energy of the low-pressure layer, reaching the water level. In the late stage of flat well reservoir fracturing, the daily fluid production has increased by 15%, indicating that the microbial injection fluid communicates with the near-well reservoir and spreads to the remaining oil areas in the far-well zone. The microbial injection fluid is displaced between intervals to maximally increase the scope of bio-displacing agent, reduce the oil-water interfacial tension and crude oil viscosity, and achieve the effect of enhanced oil recovery.

In summary, the beneficial effects of this disclosure are as follows:

(1) when the technical solution proposed by this disclosure is implemented, it is not necessary to use water injection wells to perform water flooding on the target interval of the oil production well, and can realize the enhanced oil recovery function of microbial water flooding in one step, so that the construction period is relatively short and the construction process is simple, which is beneficial to speed up the progress of oilfield exploitation;

(2) the technical solution proposed by this disclosure does not need to open and close the well multiple times, thereby not affecting the energy supplement of the reservoir;

(3) in the technical solution proposed by this disclosure, the injection fluid containing the microbial oil-displacing agent is injected from the swallowing segments, and the displaced crude oil is transported to the exhaling segments, which can not only greatly increase the communication scope of the oil-displacing agent, connect remaining oil areas in the near and far well zones, but also reduce the oil-water interfacial tension and crude oil viscosity, realize the stimulation effect of enhanced oil recovery, compensate the pressure and fluid deficit caused by production, supplement the formation energy of the low-pressure layer, and achieve the effect of energy-enhancement and oil displacement after the fracturing of horizontal well reservoir, thus increasing the output of a single well;

(4) problems such as water lock effect and water channeling will not occur.

Therefore, the technical solution disclosed by this disclosure has obvious progress and practicability compared with the prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. Enhanced oil recovery method with single well huff and puff and inter-segment oil displacement after horizontal well fracturing, including the following steps:
   S1 screening out an implementation well that meets the requirements of a preset standard, wherein the preset standards are: reservoir temperature <90° C., reservoir pressure <15 MPa, formation water salinity <12000 mg/L, formation permeability >5×10$^{-3}$ µm$^2$, and crude oil viscosity <50,000 mPa·s;
   S2 selecting a target interval that can be used for enhanced oil recovery in the implementation well;
   S3 obtaining reservoir parameters and perforation parameters of the target interval, so as to divide the target interval into several groups of swallowing and exhaling segments;
   S4 injecting an injection liquid containing microbial oil-displacing agent into each of the swallowing segments, and simmering the implementation well for a period of time, wherein a mass percentage of the microbial oil-displacing agent in the injection liquid is 0.25-1.0%;
   S5 after the well simmering, an oil-water mixture replaced by the injection fluid is produced from each exhaling segment.

2. The enhanced oil recovery method with single well huff and puff and inter-segment oil displacement after horizontal well fracturing according to claim 1, wherein the reservoir parameters include sensitivity analysis data, fluid property data, and production data, and the perforation parameters include the number of perforation clusters, cluster length, cluster spacing, and the number of holes per cluster.

3. The enhanced oil recovery method with single well huff and puff and inter-segment oil displacement after horizontal well fracturing according to claim 1, wherein a volume of the injection fluid injected into the swallowing segment is 30%-40% of a fracturing fluid volume, and a flow rate of the injection fluid is 3-6 m$^3$/min.

4. The enhanced oil recovery method with single well huff and puff and inter-segment oil displacement after horizontal well fracturing according to claim 1, wherein before the step S4, the method further includes the following step: running a packer and a production tubing into the implementation well to set the target interval of the implementation well.

5. The enhanced oil recovery method with single well huff and puff and inter-segment oil displacement after horizontal well fracturing according to claim 1, wherein the mass percentage of the biological oil-displacing agent in the injection liquid is 0.5%.

6. The enhanced oil recovery method with single well huff and puff and inter-segment oil displacement after horizontal well fracturing according to claim 1, wherein a duration of the well simmering is 10-15 days.

7. The enhanced oil recovery method with single well huff and puff and inter-segment oil displacement after horizontal well fracturing according to claim 1, wherein the step S5 further includes the following step: obtaining a pressure drop, daily fluid production and incremental data during the simmering period to evaluate a production cycle and input-output ratio of the implementation well stimulation and energy-enhancing oil displacement.

* * * * *